United States Patent
Rübenacker et al.

(10) Patent No.: US 6,586,534 B1
(45) Date of Patent: Jul. 1, 2003

(54) AGGLOMERATED PARTICLES OF FINELY DIVIDED POLYMERS WHICH ARE WATER-SOLUBLE OR CAPABLE OF SWELLING IN WATER AND CONTAIN AMMONIUM CARBOXYLATE GROUPS

(75) Inventors: Martin Rübenacker, Altrip (DE); Reinhard Schneider, Fussgönheim (DE); Jürgen Nieberle, Wachenheim (DE); Heinrich Hartmann, Limburgerhof (DE); Walter Denzinger, Speyer (DE); Axel Kistenmacher, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 709 days.

(21) Appl. No.: 08/809,710

(22) PCT Filed: Sep. 23, 1995

(86) PCT No.: PCT/EP95/03772
§ 371 (c)(1),
(2), (4) Date: Apr. 4, 1997

(87) PCT Pub. No.: WO96/10589
PCT Pub. Date: Apr. 11, 1996

(30) Foreign Application Priority Data

Oct. 4, 1994 (DE) .......................... 44 35 425

(51) Int. Cl.⁷ .................................. C08F 8/00
(52) U.S. Cl. ................ 525/327.8; 525/329.4; 525/329.9; 526/306; 526/307.6; 526/318.5
(58) Field of Search ............. 526/306, 307.6, 526/318.5; 525/327.8, 329.4, 329.9

(56) References Cited

U.S. PATENT DOCUMENTS

| | | | | |
|---|---|---|---|---|
| 2,982,749 A | * | 5/1961 | Friedrich | |
| 3,200,098 A | * | 8/1965 | Goren | 526/306 |
| 4,618,631 A | * | 10/1986 | Takeda | 521/109.1 |
| 4,777,231 A | | 10/1988 | Bailey et al. | |
| 5,346,986 A | * | 9/1994 | Schneider | 528/495 |

FOREIGN PATENT DOCUMENTS

| | | |
|---|---|---|
| EP | A 0 412 388 | 2/1991 |
| GB | 1 319 632 | 6/1973 |
| JP | 154708 | * 9/1983 |
| WO | WO 92/13912 | 8/1992 |

* cited by examiner

Primary Examiner—Bernard Lipman
(74) Attorney, Agent, or Firm—Oblon, Spivak, McClelland, Maier & Neustadt, P.C.

(57) ABSTRACT

Agglomerated polymer particles of finely divided, water-soluble or water-swellable polymers containing ammonium carboxylate groups are prepared by azeotropic removal of water from water-in-oil emulsions of the water-soluble or water-swellable polymers which contain ammonium carboxylate groups in the presence of from 0.1 to 40% by weight, based on the polymers, of polyalkylene glycols which have an agglomerating effect and which are obtainable by an addition reaction of $C_2$–$C_4$-alkylene oxides with alcohols, phenols, amines or carboxylic acids and contain at least two polymerized alkylene oxide units and additionally of from 0.1 to 20% by weight, based on the polymers, of protective colloids which are obtainable by free radical copolymerization of $C_8$–$C_{40}$-monoolefins with monoethylenically unsaturated $C_4$–$C_6$-dicarboxylic anhydrides by a mass polymerization method at from 80 to 300° C. to give copolymers having molecular weights of from 500 to 20,000 g/mol, and said agglomerated polymer particles are used as thickeners for textile pigment print pastes.

3 Claims, No Drawings

AGGLOMERATED PARTICLES OF FINELY DIVIDED POLYMERS WHICH ARE WATER-SOLUBLE OR CAPABLE OF SWELLING IN WATER AND CONTAIN AMMONIUM CARBOXYLATE GROUPS

BACKGROUND OF THE INVENTION

1. Field of the Invention

The present invention relates to agglomerated particles of finely divided, water-soluble or water-swellable polymers which contain ammonium carboxylate groups and at least 50% by weight of a monoethylenically unsaturated carboxylic acid as polymerized units, the agglomerated particles having a mean particle diameter of from 20 to 2500 μm and consisting of primary particles having a mean particle diameter of from 0.1 to 15 μm, which are obtainable by polymerization of monomer mixtures of at least 50% by weight of a monoethylenically unsaturated carboxylic acid, in the presence or absence of other monomers and of crosslinking agents, by a water-in-oil polymerization method and can be prepared by azeotropic removal of water from the water-in-oil polymer emulsion containing the primary particles, in the presence of polyalkylene glycols which have an agglomerating effect and which a) are obtainable by an addition reaction of $C_2$–$C_4$-alkylene oxides with alcohols, phenols, amines or carboxylic acids and b) contain at least two polymerized alkylene oxide units, and the agglomerated polymer particles disintegrating into the primary particles on introduction into an aqueous medium, processes for the preparation of the agglomerated polymer particles by the azeotropic removal of water from water-in-oil emulsions of water-soluble or water-swellable polymers which contain ammonium carboxylate groups and have a mean particle diameter of from 0.1 to 15 μm, in the presence of from 0.1 to 40% by weight, based on the polymers, of polyalkylene glycols which have an agglomerating effect and which a) are obtainable by an addition reaction of $C_2$–$C_4$-alkylene oxides with alcohols, phenols, amines or carboxylic acids and b) contain at least two polymerized alkylene oxide units, and isolation of the particles, and the use of the agglomerated polymer particles as thickeners for pigment print pastes.

2. Description of the Background

G-A-1 319 632 discloses a process for the preparation of granular polymers in which first of all a water-in-oil emulsion of a water-soluble monomer in an organic solvent is prepared, the emulsion containing ethylcellulose or polyvinyl acetate and a water-soluble emulsifier comprising a condensate of ethylene oxide or propylene oxide and alcohols, amines, amides, fatty acids or phenols. The water-in-oil emulsion is subsequently polymerized in the presence of initiators and then dewatered by azeotropic distillation. The granular polymer is filtered off. It has a particle size of from about 1 to 6 mm. Such coarse-particled polymers dissolve only very slowly in water.

WO-A-92/13912 discloses agglomerated particles of water-soluble or water-swellable polymers having a mean particle diameter of from 20 to 5000 μm. The agglomerated polymer particles consist of primary particles having a mean diameter of from 0.1 to 15 μm and are prepared by polymerization of water-soluble monomers, in the presence or absence of crosslinking agents, by a water-in-oil polymerization method and subsequent azeotropic removal of water from the water-in-oil polymer emulsion containing the primary particles in the presence of polyalkylene glycols which have an agglomerating effect and which a) are obtainable by an addition reaction of $C_2$–$C_4$-alkylene oxides with alcohols, phenols, amines or carboxylic acids and b) contain at least two polymerized alkylene oxide units.

The agglomerated polymer particles disintegrate into the primary particles on introduction into an aqueous medium. However, difficulties occur in the azeotropic removal of water from polymers which contain ammonium carboxylate groups because different amounts of ammonia simultaneously evaporate depending on the duration of removal, leading to a nonreproducible degree of hydrolysis of the polymer. Consequently, the polymer is quantitatively deposited on the wall of the kettle used for removal of water until the stirrer ceases to rotate.

Moreover, it is difficult to establish the particle size of the agglomerated polymers in a controlled manner.

OBJECTS OF THE INVENTION

It is an object of the present invention to provide agglomerated particles of finely divided, water-soluble or water-swellable polymers containing ammonium carboxylate groups and a process for their preparation. The polymers should have a narrow particle size distribution, the maximum of the particle size distribution being readily variable by changing the process conditions in the preparation.

SUMMARY OF THE INVENTION

We have found that this object is achieved, according to the invention, by agglomerated particles of finely divided, water-soluble or water-swellable polymers which contain ammonium carboxylate groups and at least 50% by weight of a monoethylenically unsaturated carboxylic acid as polymerized units, the agglomerated polymer particles having a mean particle diameter of from 20 to 2500 μm and consisting of primary particles having a mean diameter of from 0.1 to 15 μm, which are obtainable by polymerization of monomer mixtures of at least 50% by weight of monoethylenically unsaturated carboxylic acids in the presence or absence of other monoethylenically unsaturated monomers and crosslinking agents by a water-in-oil polymerization method and can be prepared by azeotropic removal of water from the water-in-oil polymer emulsion containing the primary particles, in the presence of polyalkylene glycols which have an agglomerating effect and which a) are obtainable by an addition reaction of $C_2$–$C_4$-alkylene oxides with alcohols, phenols, amines or carboxylic acids and b) contain at least two polymerized alkylene oxide units, and the agglomerated polymer particles disintegrating into the primary particles on introduction into an aqueous medium, if the azeotropic removal of water is additionally carried out in the presence of from 0.1 to 20% by weight, based on the polymers, of protective colloids which are obtainable by free radical copolymerization of a) $C_8$–$C_{40}$-monoolefins with b) monoethylenically unsaturated $C_4$–$C_6$-dicarboxylic anhydrides by a mass polymerization method at from 80 to 300° C. to give copolymers having molecular weights of from 500 to 20,000 g/mol.

The present invention furthermore relates to a process for the preparation of agglomerated polymer particles by azeotropic removal of water from water-in-oil emulsions of water-soluble or water-swellable polymers which contain ammonium carboxylate groups and have a mean particle diameter of from 0.1 to 15 µm, in the presence of from 0.1 to 40% by weight, based on the polymers, of polyalkylene glycols which have an agglomerating effect and which a) are obtainable by an addition reaction of $C_2$–$C_4$-alkylene oxides with alcohols, phenols, amines or carboxylic acids and b) contain at least two polymerized alkylene oxide units, and isolation of the particles, if the azeotropic removal of water is additionally carried out in the presence of from 0.1 to 20% by weight, based on the polymers, of protective colloids which are obtainable by free radical copolymerization of a) $C_8$–$C_{40}$-monoolefins with b) monoethylenically unsaturated $C_4$–$C_6$-dicarboxylic anhydrides by a mass polymerization method at from 80 to 300° C. to give copolymers having molecular weights of from 500 to 20,000 g/mol.

DETAILED DESCRIPTION OF THE INVENTION

In order to obtain the novel agglomerated polymer particles, it is possible either first to polymerize monomer mixtures which contain at least 50% by weight of a monoethylenically unsaturated carboxylic acid and, if required, other monoethylenically unsaturated monomers and, if required, crosslinking agents, the carboxylic acids being, if required, in the form partly or completely neutralized with ammonia, by the known water-in-oil polymerization method or, if such water-in-oil polymer emulsions are available, to start directly from these and to remove water azeotropically from the emulsions in the presence of the polyalkylene glycols which have an agglomerating effect and the protective colloids to be used according to the invention. If the free carboxylic acids are used in the polymerization, at least partial neutralization of the copolymers with ammonia or amines is carried out before the azeotropic removal of water.

Suitable monomers are water-soluble monoethylenically unsaturated carboxylic acids. They may be used in the form of the free acids or, preferably, in the form partly or completely neutralized with ammonia or amines. Examples of the monomers are monoethylenically unsaturated $C_3$–$C_6$-carboxylic acids, such as acrylic acid, methacrylic acid, itaconic acid, maleic acid, fumaric acid and ethacrylic acid. From this group of monomers, acrylic acid, methacrylic acid or mixtures of acrylic acid and methacrylic acid in any ratio are preferably used. The neutralization of the monomers is preferably carried out in an aqueous medium with ammonia or amines, such as methylamine, ethylamine, n-propylamine, isopropylamine, butylamine, morpholine, monoethanolamine, diethanolamine or triethanolamine.

The monoethylenically unsaturated carboxylic acids can be copolymerized either alone or as a mixture with other monoethylenically unsaturated monomers to give water-soluble copolymers. Such monomer mixtures contain at least 50% by weight of a monoethylenically unsaturated carboxylic acid. Suitable other monoethylenically unsaturated monomers are water-soluble monomers, such as acrylamide, methacrylamide, acrylonitrile, methacrylonitrile, acrylamidomethylpropanesulfonic acid, vinylsulfonic acid, vinylphosphonic acid, vinyllactic acid, N-vinylpyrrolidone, vinylimidazole, 2-vinylimidazole, N-vinylformamide, hydroxyethyl acrylate, hydroxypropyl acrylate, hydroxyethyl methacrylate, hydroxypropyl methacrylate, N-methylolacrylamide and N-methylolmethacrylamide. Further suitable monoethylenically unsaturated monomers which, if desired, may be copolymerized with the monoethylenically unsaturated carboxylic acids to give water-soluble copolymers are described in WO-A-92/13912. The other monoethylenically unsaturated monomers are used in the monomer mixture preferably in amounts of up to 50% by weight. The monoethylenically unsaturated carboxylic acids can, if desired, also be copolymerized with water-insoluble monomers, said monomers being used in an amount such that the corresponding copolymers are still water-soluble or the copolymers in the form of the ammonium salts are water-soluble. Examples of water-insoluble monomers are vinyl acetate, vinyl propionate, vinyl butyrate and $C_1$–$C_{18}$-alkyl esters of monoethylenically unsaturated $C_3$–$C_6$-carboxylic acids, e.g. methyl acrylate, ethyl acrylate, octyl acrylate, palmityl acrylate, stearyl acrylate, methyl methacrylate, ethyl methacrylate and palmityl methacrylate.

In order to prepare water-swellable polymers, the above-mentioned monomers are polymerized in the presence of crosslinking agents. Known crosslinking agents are compounds which contain at least two ethylenically unsaturated nonconjugated double bonds in the molecule.

Examples of suitable crosslinking agents are N,N'-methylenebisacrylamide, polyethylene glycol diacrylates and polyethylene glycol dimethacrylates, which are each derived from polyethylene glycols having a molecular weight of from 106 to 8500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane which are diesterified or triesterified with acrylic acid or methacrylic acid, polyhydric alcohols which are at least diesterified with acrylic acid or methacrylic acid, such as glycerol or pentaerythritol, triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythritol triallyl ether and/or divinylethyleneurea and/or triallylmonoalkylammonium salts, e.g. triallylmethylammonium chloride. Water-soluble crosslinking agents, e.g. N,N'-methylenebisacrylamide, polyethylene glycol diacrylates, polyethylene glycol dimethacrylates, pentaerythrityl triallyl ether and/or divinylurea are preferably used. The crosslinking agents are used, for example, in an amount of from 50 to 5000 ppm, corresponding to about 0.003–0.3 mol %, based on the monomers used in the polymerization.

In order to polymerize the monomers, they are first dissolved in water. The concentration of the monomers in the aqueous solution is, for example, from 20 to 80, preferably from 30 to 60, % by weight. The aqueous solution is then emulsified in an inert hydrophobic liquid (oil phase) in the presence of at least one water-in-oil emulsifier with formation of a water-in-oil emulsion. Virtually all water-immiscible liquids which do not interfere in the polymerization may be used as inert hydrophobic liquids. Aliphatic and aromatic hydrocarbons or mixtures of aliphatic and aromatic hydrocarbons are preferably used for this purpose. Suitable aliphatic hydrocarbons are, for example, pentane, hexane, heptane, octane, nonane, decane, cyclohexane, methylcyclohexane, decalin, isooctane and ethylcyclohexane. Aromatic hydrocarbons which are used as the hydrophobic liquid in the reverse suspension polymerization are, for example, benzene, toluene, xylene and isopropylbenzene. It is of course also possible to use halohydrocarbons, such as tetrachloroethane, hexachloroethane, trichloroethane and chlorobenzene. Cyclohexane, methylcyclohexane or hydrocarbons boiling within the range from 60 to 170° C. are preferably used. The oil phase accounts for from 15 to 70, preferably from 20 to 60, % by weight of the water-in-oil polymer emulsion.

The relevant known water-in-oil emulsifiers are used for dispersing the aqueous monomer solution in the oil phase. These are, for example, sorbitan esters, such as sorbitan monostearate, sorbitan monooleate, sorbitan palmitate and sorbitan laurate, and glyceryl esters whose acid component is derived from $C_{14}$–$C_{20}$-carboxylic acids. Further suitable emulsifiers are the water-in-oil emulsifiers which are disclosed in DE-B-25 57 324 and are obtainable by reacting A) $C_{10}$–$C_{22}$-fatty alcohols with epichlorohydrin in a molar ratio of from 1:0.5 to 1:1.5 to give glycidyl ethers, B) reacting the glycidyl ethers with (1) saturated $C_2$–$C_6$-alcohols containing from 2 to 6 OH groups or (2) monoethers thereof with $C_{10}$–$C_{22}$-fatty alcohols, in a molar ratio of glycidyl ether to (1) or (2) of from 1:0.5 to 1:6 in the presence of acids or bases, and C) alkoxylating the reaction products according to (B) with at least one $C_2$–$C_4$-alkylene oxide in the molar ratio of from 1:1 to 1:6.

The suitable water-in-oil emulsifiers have an HLB value of not more than 8. The HLB value is understood as meaning the hydrophilic lipophilic balance of the emulsifier, cf. W. C. Griffin, J. Soc. Cosmet. Chem. 1 (1949), 411. The water-in-oil emulsifiers are used in an amount of from 2 to 20, preferably from 5 to 15, % by weight, based on the monomers used. The water-in-oil emulsifiers described in the stated DE-B-2 557 324 are preferably used.

Suitable free radical polymerization initiators which may be used are all conventionally used polymerization initiators. Water-soluble initiators, such as alkali metal or ammonium peroxodisulfates, hydrogen peroxide, diacetyl peroxodicarbonate, dicyclohexyl peroxodicarbonate, tert-butyl perpivalate, dilauroyl peroxide, dibenzoyl peroxide, tert-butyl per-2-ethylhexanoate, tert-butyl permaleate, bis (tert-butylperoxo)cyclohexane, tert-butyl peracetate, dicumyl peroxide, di-tert-amyl peroxide, di-tert-butyl peroxide, cumyl hydroperoxide, tert-butyl hydroperoxide and p-menthane hydroperoxide, and azo initiators, such as 2,2'-azobis(2-methyl-N-phenylpropionamidine) dihydrochloride, 2,2'-azobis(2-methylpropionamidine) dihydrochloride, 2,2'-azobis(2,4-dimethylvaleronitrile), 2,2'-azobis(isobutyronitrile), 2,2'-azobis(2-amidinopropane) dihydrochloride and 2,2'-azobis[2-(2-imidazolin-2-yl) propane]dihydrochloride, are preferred. Preferred initiators are alkali metal and ammonium persulfates, tert-butyl perpivalate, tert-butyl per-2-ethylhexanoate, 2,2'-azobis(2,4-dimethylvaleronitrile), 2,2'-azobis(2-amidinopropane) dihydrochloride, azobis(isobutyronitrile) and 2,2'-azobis[2-(2-imidazolin-2-yl)propane]dihydrochloride. It is possible to use either a single initiator or a mixture of a plurality of initiators. The choice of the initiators depends primarily on the temperature at which the polymerization is carried out. Salts of heavy metals, for example copper, cobalt, manganese, iron, nickel and chromium salts, and/or organic compounds, such as benzoin, dimethylaniline or ascorbic acid, and reducing agents, for example alkali metal disulfites or sodium formaldehyde sulfoxylate, may additionally be used together with at least one of the abovementioned free radical polymerization initiators. Such mixtures of initiators permit polymerization at lower temperatures. The reducing component of redox initiators may be, for example, sodium sulfite, sodium bisulfite, sodium formaldehyde sulfoxylate or hydrazine. For example, from 100 to 10,000 ppm, preferably from 100 to 2000 ppm, based on the monomers used in the polymerization, of a polymerization initiator or of a mixture of a plurality of polymerization initiators are required. The stated amounts of initiator correspond to about 0.003–0.3 mol %, based on the monomers used, of initiator.

The polymerization of the water-soluble monomers is additionally carried out in the presence of at least one oil-in-water emulsifier. The use of this group of emulsifier permits the preparation of particularly finely divided water-in-oil polymer emulsions which are stable to sedimentation. The mean particle size of such polymer emulsions is, for example, from 0.1 to 15 µm, determined by Fraunhofer diffraction, cf. H. G. Barth, Modern Methods of Partial Size Analysis, John Wiley & Sons, New York, 1984. Examples of suitable oil-in-water emulsifiers are all wetting agents which have an HLB value of at least 10. This group of emulsifiers comprises essentially hydrophilic water-soluble compounds, such as ethoxylated alkylphenols or ethoxylated fatty alcohols. Products of this type are obtained, for example, by reacting $C_8$–$C_{12}$-alkylphenols or $C_8$–$C_{22}$-fatty alcohols with ethylene oxide. Preferably, $C_{12}$–$C_{18}$-fatty alcohols are ethoxylated. The molar ratio of alkylphenol or fatty alcohol to ethylene oxide is in general from 1:5 to 1:20. Further suitable emulsifiers are, for example, alkoxylated fatty amines. If emulsifiers having an HLB value of 10 or higher are used in the polymerization, they are employed, for example, in amounts of from 1 to 20, preferably from 2 to 15, % by weight, based on the monomers to be polymerized.

The polymerization of the monomers is carried out in the aqueous phase of a water-in-oil emulsion in the presence of water-in-oil emulsifiers and, if required, oil-in-water emulsifiers and in the presence of free radical polymerization initiators. The water-in-oil polymer emulsions obtainable contain the polymers in the form of primary particles having mean particle sizes of from about 0.1 to 15 µm, preferably from 0.5 to 5 µm. At least 90% of the primary particles of the water-in-oil polymer emulsion have a mean particle diameter of <10 µm.

The polymerization of the monomers may, if desired, be carried out in the presence of polymerization regulators in order to limit the molecular weight of the polymers. Examples of suitable regulators are SH-containing compounds, such as dodecyl mercaptan, thioglycol, mercaptoethanol, mercaptopropanol, mercaptobutanols, mercaptoacetic acid and mercaptopropionic acid. Further suitable regulators are carbon tetrachloride, hydroxylammonium sulfate, formic acid and its salts and alcohols, e.g. methanol, isopropanol or butylene glycol. If a regulator is used in the polymerization, it is employed in amounts of from 0.1 to 5%, based on the monomers.

The water-soluble copolymers have K values of from 150 to 300 (determined according to H. Fikentscher in 0.5% strength aqueous solution at pH 7 and 25° C.). The K values of the polymers were determined according to H. Fikentscher, Cellulose-Chemie, 93 (1932), 58 to 64 and 71 to 74. The high molecular weight polymers are preferably used as flocculants in the dewatering of sewage sludges or in papermaking.

Since the polymers of a finely divided water-in-oil polymer emulsion (ie. with particle sizes of not more than 15 µm) preferably cannot be isolated by filtration or centrifuging, according to the invention agglomeration of the polymer particles of water-in-oil polymer emulsions is effected by azeotropic removal of water from such finely divided emulsions in the presence of polyalkylene glycols which have an agglomerating effect and of special protective colloids. Said polyalkylene glycols are described in WO-A-92/13921. These are compounds which a) are obtainable by an addition reaction of $C_2$–$C_4$-alkylene oxides with alcohols, phenols, amines or carboxylic acids and b) contain at least two polymerized alkylene oxide units.

During the azeotropic removal of water from the water-in-oil polymer emulsions, the polyalkylene glycols produce agglomeration of the primary particles of the water-in-oil polymer emulsions.

After the azeotropic removal of water, agglomerations of primary particles are present, said agglomerations having a mean particle diameter of from about 20 to 2500 μm, preferably from 30 to 500 μm, according to sieve analysis. At least 70%, preferably from 80 to 99%, of the water contained in the water-in-oil emulsion polymers are removed by azeotropic distillation. Small amounts of water which remain in the polymers present no problems; on the contrary, they cause the agglomerated particles to dissolve more rapidly in water than completely dried agglomerated particles.

From 10 to 200, preferably from 50 to 150, % by weight of a hydrocarbon having a boiling point below 150° C. are advantageously added before the beginning of the azeotropic distillation to commercial water-in-oil polymer emulsions with a solids content of more than 20% by weight. The azeotropic removal of water from the water-in-oil polymer emulsion can be carried out at atmospheric or reduced pressure or, if required, at superatmospheric pressure, for example at from 100 mbar to 15 bar. The temperatures are preferably chosen so that the water-in-oil polymer emulsions from which water has to be removed are as far as possible not damaged. Usually, the water-in-oil polymer emulsions are heated to 60–170° C.

The polyalkylene glycols which are suitable as agglomeration assistants are obtainable, for example, by subjecting the suitable alkylene oxides, ie. ethylene oxide, propylene oxide, 1,2-butylene oxide or isobutylene oxide, or tetrahydrofuran to an addition reaction with alcohols, phenols, amines or carboxylic acids. The stated alkylene oxides and tetrahydrofuran may be polymerized either alone or as a mixture. If mixtures are used, polymeric compounds in which the alkylene oxide units are randomly distributed are obtained. However, the alkylene oxides may also be reacted in a conventional manner to give block copolymers. Homopolymers of ethylene oxide are obtained, for example, by subjecting ethylene oxide to an addition reaction with ethylene glycol. For the preparation of homopolymers of propylene oxide, propylene oxide is subjected to an addition reaction with 1,2-propylene glycol, 1,3-propylene glycol or a mixture of the stated isomers. The homopolymers of other alkylene oxides are prepared in a corresponding manner.

Block copolymers are prepared, for example, by first subjecting ethylene oxide to an addition reaction with ethylene glycol and allowing the reaction to go to completion and then subjecting propylene oxide to an addition reaction with the product under the conventional conditions, ie. by catalysis with alkali metal hydroxides or calcium oxide. Here, there are many possibilities for varying the sequence of the blocks of alkylene oxide units. For example, an ethylene oxide block may be followed by a propylene oxide block and the latter by an ethylene oxide block. Polyalkylene glycols which contain an ethylene oxide block, a propylene oxide block and a butylene oxide block or polyalkylene glycols in which a propylene oxide block is followed by an ethylene oxide block or polyalkylene oxides in which a butylene oxide block is followed by a propylene oxide block and, if desired, an ethylene oxide block may also be used as agglomeration assistants.

The terminal groups of the polyalkylene glycols thus formed may be blocked at one or both ends. Polyalkylene glycols blocked at one end are obtained, for example, by subjecting alkylene oxides to an addition reaction with alcohols, phenols, amines or carboxylic acids. Examples of suitable alcohols are monohydric $C_1$–$C_{22}$-alcohols, for example methanol, ethanol, n-propanol, isopropanol, n-butanol, isobutanol, n-octanol, isooctanol and stearyl alcohol. Polyhydric alcohols, for example those stated above, ethylene glycols or propylene glycols and glycerol, pentaerythritol and 1,6-hexanediol, may also be used as alcohols. The alkylene oxides may also be subjected to an addition reaction with phenol and substituted phenols, such as $C_1$–$C_{18}$-alkylphenols. Amines are also suitable for blocking terminal groups, for example $C_1$–$C_{18}$-alkyl- or dialkylamines and diamines, preferably ethylene diamine. Commercial products which are obtainable, for example, by successive addition reactions of ethylene oxide and propylene oxide with ethylenediamine are of particular interest here. Thioalcohols, such as mercaptoethanol, mercaptopropanols and mercaptobutanols, may also be alkoxylated. The terminal OH groups of the polyalkylene glycols may also be replaced, for example, by amino groups. Further polyalkylene glycols which are suitable as agglomeration assistants are those whose terminal OH groups are etherified or esterified.

The suitable polyalkylene glycols contain at least 2 polymerized alkylene oxide units. Suitable agglomeration assistants are, for example, polyethylene glycols, polypropylene glycols, block copolymers comprising ethylene oxide and propylene oxide blocks and having the structure EO-PO, PO-EO-PO or EO-PO-EO, polyethylene glycols monoetherified or dietherified with $C_1$–$C_4$-alcohols and those compounds which are obtainable by subjecting first ethylene oxide and then propylene oxide, or first propylene oxide and then ethylene oxide, to an addition reaction with ethylenediamine. Suitable polyalkylene glycols which have an agglomerating effect are, for example, diethylene glycol, triethylene glycol, tetraethylene glycol, pentamethylene glycol, hexaethylene glycol, heptaethylene glycol, octaethylene glycol, diethylene glycol dimethyl ether, diethylene glycol monomethyl ether, diethylene glycol diethyl ether, diethylene glycol monoethyl ether, triethylene glycol mono- and dimethyl ether, triethylene glycol mono- and diethyl ether, dialkylene glycol dibutyl ether, diethylene glycol monobutyl ether, diethylene glycol monopropyl ether, diethylene glycol dipropyl ether, EO-PO block copolymers having average molecular weights of from 120 to 2 million, PO-E-PO block copolymers having average molecular weights of from 178 to 2 million and EO-PO-EO block copolymers having average molecular weights of from 164 to 2 million, polypropylene glycols having molecular weights of from 134 to 2 million, dipropylene glycol diacetate, diethylene glycol diacetate, dipropylene glycol monoacetate, diethylene glycol monoacetate, dipropylene glycol dimethyl ether and dipropylene glycol monomethyl ether. The stated molecular weights are number average molecular weights. The agglomeration assistants are preferably used in amounts of from 5 to 20% by weight, based on the polymer present in the water-in-oil emulsion.

According to the invention, agglomerated polymer particles having a narrow particle size distribution are obtained if water is removed azeotropically from the water-in-oil polymer emulsions described above in the presence of polyalkylene glycols which have an agglomerating effect and protective colloids which are obtainable by free radical copolymerization of a) $C_8$–$C_{40}$-monoolefins with b) monoethylenically unsaturated $C_4$–$C_6$-dicarboxylic anhydrides by a mass polymerization method at from 80 to 300° C. to give copolymers having molecular weights of from 500 to 20,000 g/mol. Copolymers of this type are known, cf. DE-A-3 730 885 and EP-A-0 412 389. They are obtained by a mass polymerization method, by copolymerization of the monomers of group (a) with the monomers of group (b) at from 80 to 300° C. Examples of suitable monoolefins of 8 to 40 carbon atoms are n-oct-1-ene, 2,4,4-trimethylpent-1-ene, 2,4,4-trimethylpent-2-ene, diisobutene, which is industrially available as an isomer mixture comprising about 80% by weight of 2,4,4-trimethylpent-1-ene and about 20% by weight of 2,4,4-trimethylpent-2-ene, 4,4-dimethylhex-1-ene, dec-1-ene, dodec-1-ene, tetradec-1-ene, hexadec-1-ene, octadec-1-ene, $C_{20}$-1-olefin, $C_{22}$-1-olefin, $C_{24}$-1-olefin, $C_{20}$–$C_{24}$-1-olefin, $C_{24}$–$C_{28}$-1-olefin, $C_{30}$-1-olefin, $C_{35}$-1-olefin and $C_{40}$-1-olefin. The olefins or mixtures of olefins are commercial products. In addition to the straight-chain olefins, cyclic olefins, such as cyclooctene, are also suitable. The olefins may contain small amounts of inert organic hydrocarbons from the preparation, for example up to about 5% by weight. The olefins are usually used in a commercially available quality. They may not be subjected to any special purification. The preferably used olefins contain at least 12 carbon atoms. $C_{16}$–$C_{30}$-Olefins are particularly preferred.

Suitable components (b) of the copolymers are monoethylenically unsaturated $C_4$–$C_8$-dicarboxylic anhydrides, for example maleic anhydride, itaconic anhydride, mesaconic anhydride, citraconic anhydride, methylenemalonic anhydride and mixtures of these anhydrides. Among the stated anhydrides, maleic anhydride is preferably used. The copolymers contain from 40 to 60 mol % of monoolefins and from 60 to 40 mol % of the suitable dicarboxylic anhydrides as polymerized units and have a molecular weight of from 500 to 20,000, preferably from 800 to 10,000, g/mol. They are obtainable by polymerizing the monomers (a) and (b) in a molar ratio of from 1.1:1 to 1:1. The monomers (a) and (b) are preferably polymerized in a molar ratio of 1:1 or only a 1% by weight excess of monomers of component (a) is used. The monomers of groups (a) and (b) are known to form alternating copolymers which, at high molecular weights, contain 50 mol % each of the monomers (a) and (b) as polymerized units. At very low molecular weights of the copolymers, and depending on the type of terminal groups, the molar ratio may deviate from the abovementioned range if, for example, the copolymer chain starts with the monomer (a) and also terminates with the monomer (a).

The copolymers obtained in the mass polymerization contain anhydride groups and have molecular weights of from 500 to 20,000 g/mol. The anhydride-containing copolymers are preferably used directly in the azeotropic removal of water. However, the anhydride-containing copolymers may also be first hydrolyzed so that copolymers which contain acid groups may be used equally successfully as protective colloids are present. It is also possible to modify the anhydride-containing copolymers by reaction with alcohols, alkali metal bases, ammonia or amines, so that the derivatives described in EP-A-0 412 389, such as ester-, carboxylate- and amido-containing copolymers, are formed. These derivatives are likewise described in detail in EP-A-0 412 389. In the azeotropic removal of water from the water-in-oil polymer emulsions, from 0.1 to 20, preferably from 1 to 5, % by weight, based on the polymers, of a protective colloid or of a mixture of the protective colloids to be used according to the invention are employed. These protective colloids have a decisive effect on the particle size distribution of the agglomerated polymer particles. Finely divided powders having a very narrow particle size distribution are obtained in this manner. For example, the proportion of one particle size in the powder is at least 48, preferably above 60, % by weight.

After the azeotropic removal of water, agglomerated polymer particles are present in a hydrocarbon oil. The polymer particles can be readily isolated therefrom, for example by filtration, decanting of the hydrocarbon oil or centrifuging. Adhering hydrocarbon oil can readily be removed from the agglomerated polymer particles, for example by drying in a drying oven, preferably at relatively high temperatures and under reduced pressure.

The agglomerated polymer particles preferably consist of crosslinked polyacrylic acid, crosslinked polymethacrylic acid, crosslinked copolymers of acrylic acid and methacrylic acid or crosslinked copolymers of acrylic acid and acrylamide and/or methacrylamide containing from 1 to 20% by weight of polymerized acrylamide and/or methacrylamide and crosslinked copolymers of methacrylic acid and acrylamide or methacrylamide containing from 1 to 20% by weight of polymerized amides, in each case partially or completely neutralized with ammonia or amines. The content of crosslinking agent in the crosslinked copolymers is preferably from 50 to 2000 ppm, based on the monomers, the preferably used crosslinking agent being methylenebisacrylamide. When introduced into an aqueous medium, for example into an aqueous polymer emulsion or an aqueous textile print paste, the agglomerated polymers rapidly disintegrate into the primary particles. The crosslinked polymers swell in water and thus increase the viscosity of the aqueous system. In the case of water-soluble polymers, for example high molecular weight polyacrylic acid, the primary particles formed from the agglomerated polymer particles dissolve in water. The agglomerated crosslinked polymer particles are used as thickeners for textile pigment print pastes. The amount of thickener is from about 0.5 to 5% by weight, based on the print paste.

In the examples which follow, percentages are by weight.

Preparation of the Water-in-oil Polymers

Polymer 1

The mixture described below as the oil phase is initially taken in a polymerization container having a capacity of 2 liters and equipped with an anchor stirrer, a thermometer, a nitrogen inlet and a nitrogen outlet.

Oil phase 482 g of cyclohexane, 15 g of the water-in-oil emulsifier 1 of EP-A-0 412 388 (reaction product of (A) oleyl alcohol with epichlorohydrin in a molar ratio of 1:1 to give oleyl glycidyl ether, (B) reaction of the oleyl glycidyl ether with glycerol in a molar ratio of 1:1 in the presence of $BF_3$/phosphoric acid at 80° C. and removal of the catalyst with the aid of a basic ion exchanger and (C) ethoxylation of the reaction product according to (B) with 2 mol of ethylene oxide)

10 g of a surfactant (reaction product of 1 mol of $C_{13}$/$C_{15}$-oxo alcohol with 8 mol of ethylene oxide).

A monomer solution comprising 153.8 g of acrylic acid, 18.3 g of acrylamide, 0.08 g of the penta sodium salt of diethylenetriaminepentaacetic acid and 0.051 g of methylenebisacrylamide is added to the initially taken oil phase.

0.086 g of 2,2'-azobis(2-amidinopropane)dihydrochloride is then also added and the aqueous phase is emulsified under a nitrogen atmosphere at a stirring speed of 200 rpm in the oil phase. The reaction mixture is then heated to 55–60° C. and polymerized in the stated temperature range for 1.5 hours. A further 0.086 g of 2,2'-azobis(2-amidinopropane) dihydrochloride is then added and polymerization is continued for 2 hours at 65° C. A water-in-oil polymer emulsion having a solids content of about 22% and a mean particle size of the emulsified particles of from 0.1 to 15 μm is obtained.

EXAMPLE 1

In a 2 liter glass flask equipped with a thermometer, an anchor stirrer and a water separator, 500 g of polymer 1 are initially taken together with 350 ml of cyclohexane, 10 g of polyethylene glycol having an average molecular weight of 300 and 1.25 g of an alternating copolymer of maleic anhydride and a mixture of $C_{20}/C_{24}$-olefin having an average molecular weight of 10,000 g/mol and are stirred at a speed of 200 rpm. The content of the flask is then heated to 70–80° C. and water is distilled off azeotropically. The azeotropic distillation is complete after about 5 hours. The resulting polymer suspension in cyclohexane rapidly settles out. The polymer is filtered off and is dried at 50° C. in a drying oven under reduced pressure. The stirrer and flask are virtually free of deposits. A colorless, free-flowing crosslinked polymer which does not produce dust and whose sieve analysis is shown in the Table is obtained.

EXAMPLE 2

Example 1 is repeated with the only exception that 1.5 g of the alternating copolymer of maleic anhydride and olefins are used. A colorless, free-flowing polymer which does not produce dust and has the sieve analysis shown in the Table is likewise obtained.

EXAMPLE 3

Example 1 is repeated with the only exception that 1.75 g of the alternating copolymer of maleic anhydride and $C_{20}/C_{24}$-olefin mixture are used. A colorless, free-flowing polymer which does not produce dust and has the sieve analysis shown in the Table is obtained.

EXAMPLE 4

Example 1 is repeated with the exception that 1.25 g of an alternating copolymer of maleic anhydride and a mixture of $C_{20}/C_{24}$-olefin having an average molecular weight of 4200 g/mol is used in the azeotropic removal of water. A colorless, free-flowing polymer which does not produce dust and whose sieve analysis is shown in Table 1 is obtained.

EXAMPLE 5

Example 1 is repeated with the exception that 7.5 g of polyethylene glycol having an average molecular weight of 300 and 1 g of a copolymer of maleic anhydride and a $C_{20}/C_{24}$-olefin mixture having an average molecular weight of 4200 g/mol are used in the azeotropic removal of water. A colorless, free-flowing polymer which does not produce dust and whose sieve analysis is shown in Table 1 is obtained.

EXAMPLE 6

Example 1 is repeated with the exception that, instead of the protective colloid used there, 0.65 g of an alternating copolymer of maleic anhydride and a $C_{20}/C_{24}$-olefin mixture having an average molecular weight of 4200 g/mol is now used in the azeotropic removal of water. A colorless, free-flowing polymer which does not produce dust and whose sieve analysis is shown in Table 1 is obtained.

Comparative Example

Example 1 is repeated with the exception that, instead of the alternating copolymer of maleic anhydride and $C_{20}/C_{24}$-olefin mixture, 5 g of a 25% strength solution of the protective colloid 1 described in WO-A-92/13912 are used.

The protective colloid 1 is obtained by initially taking a mixture of the following components in a polymerization apparatus and refluxing it:

1700 g of a polymer which was prepared by continuous polymerization of a monomer mixture comprising 83% of styrene and 17% of methacrylic acid at from 249 to 251° C. at 24 mbar and had a molecular weight of 1870, an acid number of 104 mg KOH/g, a hydrogenation iodine number of 14 g per 100 g of polymer and a softening point of 138° C., 532 g of maleic anhydride, 1600 g of cyclohexane, 2470 g of tert-butyl acrylate and 65 g of tert-butyl perpivalate.

A solution of 4730 g of tert-butyl acrylate and 568 g of styrene in 1766 g of cyclohexane is added in each case in the course of 2 hours after the beginning of the refluxing, and at the same time a solution of 260 g of tert-butyl perpivalate in 833 g of cyclohexane is introduced. After complete metering of the monomers and of the polymerization initiator, the reaction mixture is refluxed for a further 2 hours and then diluted with cyclohexane. A protective colloid dispersion having a polymer content of 17.7% is obtained. The copolymer has a K value of 32 (determined according to H. Fikentscher, Cellulose-Chemie, 13 (1932), 58–64 and 71–74, at 25° C. and a polymer concentration of 0.5% in solution).

With the use of this protective colloid according to WO-A-92/13912, a colorless, free-flowing polymer which does not produce dust is likewise obtained, but this polymer has a substantially broader particle size distribution than the novel agglomerated polymers.

TABLE

Sieve analyses of the agglomerated polymer particles

| | Sieve [μm] | | | | | | | |
|---|---|---|---|---|---|---|---|---|
| | 0 | 100 | 160 | 315 | 500 | 800 | 1000 | 1400 | 2500 |

| Example | | | | | | | | | |
|---|---|---|---|---|---|---|---|---|---|
| 1 | 2.2 | 3.5 | 67.0 | 14.8 | 8.1 | 0.4 | 1.2 | 1.9 | 0.9 |
| 2 | 1.2 | 4.9 | 74.1 | 10.6 | 4.6 | 1.5 | 1.1 | 1.4 | 0.6 |
| 3 | 2.4 | 6.0 | 71.9 | 5.8 | 8.8 | 1.9 | 0.8 | 1.7 | 0.6 |
| 4 | 0.3 | 0.2 | 10.6 | 64.4 | 15.0 | 1.3 | 1.9 | 3.4 | 2.9 |

TABLE-continued

Sieve analyses of the agglomerated polymer particles

| | Sieve [μm] | | | | | | | |
|---|---|---|---|---|---|---|---|---|
| | 0 | 100 | 160 | 315 | 500 | 800 | 1000 | 1400 | 2500 |
| 5 | 0.1 | 0.1 | 0.2 | 4.7 | 80.9 | 11.0 | 1.1 | 0.8 | 1.2 |
| 6 | 0.3 | 0.2 | 0.5 | 1.3 | 12.4 | 22.6 | 56.0 | 6.4 | 0.5 |
| Comparative Example | 0.1 | 0.1 | 0.5 | 1.0 | 10.4 | 18.1 | 39.4 | 30.1 | 0.4 |

We claim:

1. A process for the preparation of agglomerated polymer particles of finely divided, water-soluble or water-swellable polymer which contain ammonium carboxylate groups and at least 50% by weight of a monethylenically unsaturated carboxylic acid as polymerized units, the agglomerated particles having a mean particle diameter of from 20 to 2500 μm and consisting of primary particles having a mean particle diameter of from 0.1 to 15 μm, which are obtained by polymerization of a monomer composition comprising at least 50% by weight of monethylenically unsaturated carboxylic acids and, optionally, other monoethylenically unsaturated monomers and, optionally, a crosslinking agent by a water-in-oil polymerization method, comprising azeotropically removing at least 70% of the water from water-in-oil emulsions of water-soluble or water-swellable polymers which contain ammonium carboxylate groups and have a mean particle diameter of from 0.1 to 15 μm, in the presence of
1) from 0.1 to 40% by weight, based on the polymers, of polyalkylene glycols which have an agglomerating effect and which
   a) are obtained by an addition reaction of $C_2$–$C_4$-alkylene oxides with alcohols, phenols, amines or carboxylic acids and
   b) contain at least two polymerized alkylene oxide units, and
2) from 0.1 to 20% by weight, based on the polymers, of protective colloids which are obtained by free radical copolymerization of
   a) $C_8$–$C_{40}$-monoolefins with
   b) monoethylenically unsaturated C4–C6-dicarboxylic anhydrides by a mass polymerization method at from 80 to 300° C. to produce copolymers having molecular weights of from 500 to 20,000 g/mol, and containing from 40 to 60 mol % of polymerized monoolefins and from 60 to 40 mol % of polymerized monoethylenically unsaturated carboxylic acids, it being possible for the copolymers containing anhydride groups to be hydrolyzed to copolymers containing acid groups or to be modified by reaction with alcohols, alkali metal bases, ammonia or amines; and isolating the agglomerated polymer particles.

2. A process for the preparation of agglomerated polymer particles as claimed in claim 1, wherein, in the polymerization, acrylic acid, methacrylic acid or a mixture of acrylic acid and methacrylic acid is used as the water-soluble monomers and methylenebisacrylamide is used as the crosslinking agent, and the carboxylic acids may be present in a form partially or completely neutralized with ammonia.

3. A process as claimed in claim 1, wherein, in the copolymerization, a mixture of acrylic acid and acrylamide and/or methacrylamide or a mixture of methacrylic acid and acrylamide and/or methacrylamide is used as the water-soluble monomers and methylenebisacrylamide is used as the crosslinking agent.

* * * * *